United States Patent [19]

Brown

[11] Patent Number: 4,815,593
[45] Date of Patent: Mar. 28, 1989

[54] COMBINED STORAGE BOX, TRAY AND RACK

[76] Inventor: Fred R. Brown, P.O. Box 424, Booneville, Ark. 72927

[21] Appl. No.: 88,534

[22] Filed: Aug. 20, 1987

Related U.S. Application Data

[63] Continuation of Ser. No. 818,370, Jan. 13, 1986, abandoned.

[51] Int. Cl.[4] ............................................... B65D 25/04
[52] U.S. Cl. ................................ 206/315.11; 43/54.1; 206/373; 211/70.6; 312/DIG. 33
[58] Field of Search ................ 43/21.2, 26, 54.1, 57.1; 190/35; 206/223, 234, 315.1, 315.11, 349, 372, 373, 443, 561, 576; 211/60.1, 64, 68, 69, 70.2, 70.6, 70.8, 126, 133; 248/146; 269/16, 296; 312/239, 244, 352, DIG. 33

[56] References Cited

U.S. PATENT DOCUMENTS

| | | | |
|---|---|---|---|
| 2,070,507 | 2/1937 | Bishop | 211/60.1 |
| 2,740,517 | 4/1956 | Evans | 206/373 |
| 3,288,304 | 11/1966 | Graves | 211/64 |
| 4,460,085 | 7/1984 | Jantzen | 206/372 |

Primary Examiner—Jimmy G. Foster

[57] ABSTRACT

A storage box for use behind the seat of trucks, with improved storage convenience through combining a rack for long items, a trough-like storage with good visibility for storing and finding small items, and a box for large tools and accessories.

11 Claims, 1 Drawing Sheet

COMBINED STORAGE BOX, TRAY AND RACK

This application is a continuation, of application Ser. No. 818,370, filed Jan. 13, 1986 now abandoned.

SUMMARY OF THE INVENTION

Storage unit comprised of a box-like general storage area; with a tray for small-item storage indented into the top of the box; and with a rack consisting of projections for support of long items above the box, one projection located near each end of the unit so as to provide a carrying device for long items placed into the rack.

One object of the present invention is to provide additional storage capabilities when used behind the seat of pick-up trucks.

Related objects and advantages of the present invention will be apparent from the following description.

BACKGROUND OF THE INVENTION

Figure 1:
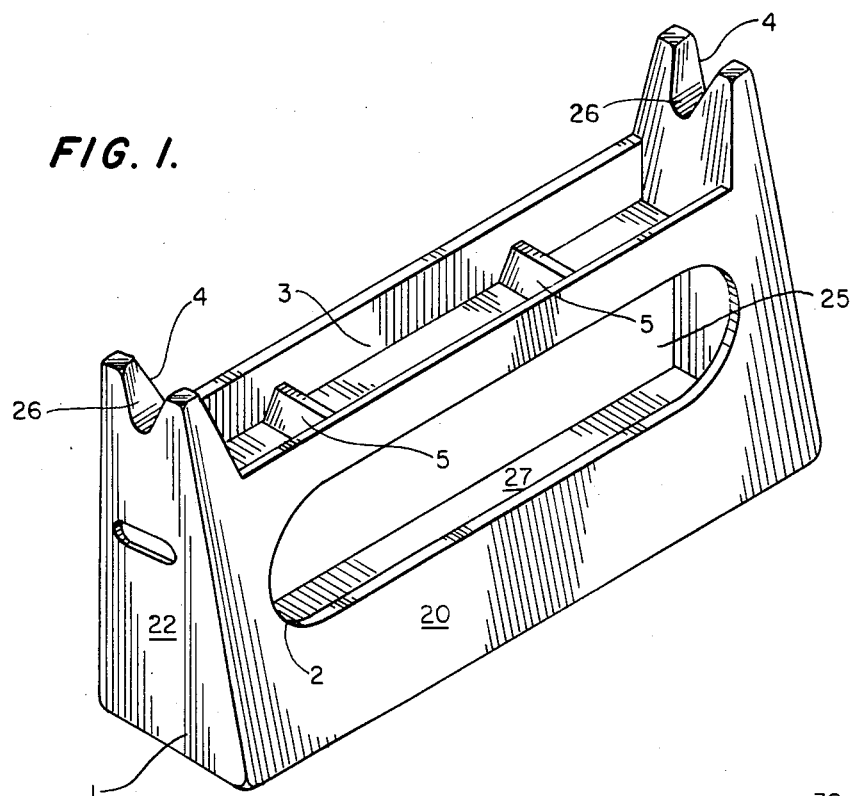
FIG. 1 is a perspective view of a behind-the-seat storage unit for pick-up trucks with the features of a combined storage box, tray and rack according to a typical embodiment of the present invention.

The applicant is a hunter, fisherman and part-time farmer, and as such required storage capabilities in the pick-up truck used in these activities. Since no acceptable device was available, the applicant designed and built a model which satisfies these needs.

The body of this item is a box-like storage compartment with an entry sufficient to accommodate storage items such as come-along, tow chains, medium size fishing tackle boxes, large wrenches, and other large and heavy items, as well as gloves, rain gear, tie-down ropes and like lighter objects.

The tray indented into the top of the body, conveniently stores small items so they are visible and accessible.

The rack, consisting of vertical projections embodying holding devices at both ends of the body, at a proper distance apart to cradle a gun, and extending above the body sufficiently high as to have access to items in said tray when long items such as guns, fishing rods, canes, fence members and other items rest in the notches.

Hand holes at either end of the box make removal from the vehicle convenient, so the entire box and contents can be lifted out for use as a tool box near the job site, the shooting range or the fishing site. Removal would make cleaning the vehicle easier. Also, where pillage is a possibility, the box could be removed and carried to a safe place.

Using a unit described herewith, a hunter can lay his gun in the rack, place ammunition in the tray, store extra socks and gloves in the tray or box, have a chain or rope and come-along in the box with outer clothing and tools all conveniently stored out of sight of vandals and with a clean cab for passengers.

A similar example can be made for many other recreational and work pursuits such as fishing, photography, farming, carpentry and others.

Gun racks for window mounting are often used to store some of the long items referred to above. These are a temptation to robbery and this temptation could be eliminated by behind-the-seat storage.

No applicable prior art is known to exist except that the applicant has submitted design plant application Ser. No. 06/764,924.

The design application referred to is for limited protection of a specific design, whereas this application seeks to obtain patent rights on a species of storage units which consist of storage box with a suitable entry, said entry to be either open, or covered by a lid, then a small parts tray indented into the top of the box, either as a removable tray or being a permanent indentation into the box top, then having a rack appended to the top of the box, extending upward to a height, and being spaced at such an interval near the ends of the box so as to cradle a gun or other item, all as further described on attached drawings and specifications.

DETAILED DESCRIPTION OF THE INVENTION

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention pertains.

Referring to FIG. 1, there is the perspective view of a storage unit of a size and configuration such that it will neatly fit into the area of a truck behind the seat. Body 1 of the storage unit is a hollow, box-like structure, having in the frontal wall area an entry 2 through which and into which articles may be inserted for storage. The body 1 has indented into the top surface a tray 3 which is of sufficient depth to retain small items, yet have them visible for easy removal. Said tray 3 may be divided by vertical partitions 5 into several open-topped compartments thereby permitting stored objects to be segregated further for additional ease of storage and retrieval. The body 1 additionally supports extensions upward at either end of the tray 3 to provide projections into which the rack 4 can be attached or formed. Rack 4 is constructed to receive and transport particularly guns, at a height above tray 3 to permit ready access to said tray 3. Rack 4 lends itself to storage of other long items such as fishing rods, walking canes, umbrellas, to name a few.

Again referring to FIG. 1, the storage unit consists of two elongated opposed side panels 20 as well as two opposed end panels 22. One of the side panels 20 is provided with an opening 25 therein such that various objects can be placed within the storage unit and be supported by a bottom member 27. Additionally, notches 26 extend from each of the end members 22 for the purpose of supporting various elongated articles such as guns, fishing rods and walking canes.

Figure 2:
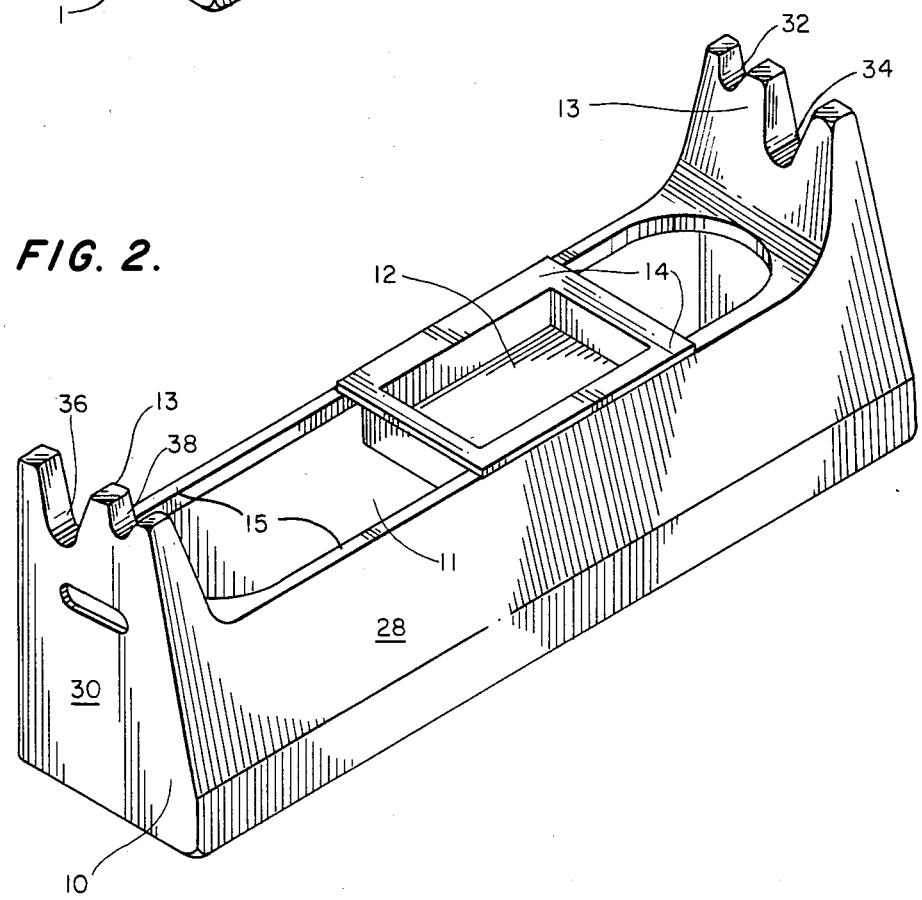
FIG. 2 is a perspective view of an alternate form of a behind-the-seat storage unit for pick-up trucks according to a typical embodiment of the present invention.

Referring to FIG. 2, a perspective view of an alternate form of a storge unit of a size and configuration such that it will be neatly fit into the area of a truck behind the seat. Body 10 of the storage unit is a hollow, box-like structure having in the top an entry 11 through which articles are placed for storage. Tray 12 is a removable part with a depth and length sufficient for small-parts storage and a width slightly less than the width of entry 11, and with flanges 14 appended horizontally at the upper edge of tray 12 in such a position that, when the tray 12 is placed into entry 11, the flanges 14 will rest on rails 15 formed by the upper edges of body 10, so that when tray 12 is placed in the position hereby described, said tray 12 will be a moveable small parts container, indented into the body 10. Body 10 additionally supports extensions upward at either end of entry 11 to provide projections into which rack 13 is to be formed or attached. Rack 13 is constructed to receive and transport particularly guns at a height above tray 12 to permit ready access to said tray 12. Rack 13 configuration lends itself to storage of many other long items such as fishing rods, walking canes, umbrellas, to name a few.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

Again referring to FIG. 2, the storge unit is composed of two opposed side members 28 as well as two opposed end members 30. Extending from each of the end members 30 are a pair of notches. Notch 36 is provided on one of the end members and is directly opposed by notch 32. Similarly, notches 34 and 38 are opposed from one another in such a manner as to allow various elongated articles such as guns or fishing rods to be supported therefrom. As is noted in the drawing, the depths of notches 32 and 36 are unequal as is the depth of notches 34 and 38. The tray 12 is supported by railings 15 and is adapted to move thereon. An opening 44 to the interior of the storage unit is provided so as to allow for the storage of various items therein.

What is claimed is:

1. A portable storage unit adapted to be provided inside the cab and behind the front seat of pick-up trucks for supporting elongated articles comprising:
   a one-piece body formed from two elongated opposed side members, two opposed end members and a bottom member, said side members, said end members and said bottom member forming a hollow interior, each of said end members extending vertically above said side members, each of said end members provided with an upwardly open V-shaped notch for supporting an elongated article therebetween, said body provided with an opening for allowing access to said hollow interior of said body; and
   a tray supported by said elongated opposed side members and provided opposite said bottom member, for supporting small items thereon.

2. The storage unit in accordance with claim 1, wherein each of said end members is provided with an additional upwardly open V-shaped notch for supporting elongated articles therebetween.

3. The storage unit in accordance with claim 2, wherein the depth of said notches for each of said side members is different.

4. The storage unit in accordance with claim 1, wherein said opening is provided in one of said side members.

5. The storage unit in accordance with claim 4, wherein said tray extends completely between said end members.

6. The storage unit in accordance with claim 5, further including partitions provided in said tray.

7. The storage unit in accordance with claim 1, wherein said tray extends completely between said end members.

8. The storage unit in accordance with claim 7, further including partitions provided in said tray.

9. The storage unit in accordance with claim 1, wherein said opening is provided opposite said bottom member.

10. A portable storage unit adapted to be provided inside the cab and behind the front seat of pick-up trucks for supporting elongated articles comprising:
    a body formed from two elongated opposed side members, two opposed end members and a bottom member, said side members, said end members and said bottom member forming a hollow interior, each of said end members extending vertically above said side members, each of said end members provided with an upwardly open V-shaped notch for supporting an elongated article therebetween, said body provided with an opening for allowing access to said hollow interior of said body; and
    a tray supported by said elongated opposed side members and provided opposite said bottom member, and adapted to laterally move along the top of said side members, said tray supporting small items thereon.

11. A portable storage unit in accordance with claim 10, wherein each of said end members includes an additional upwardly open V-shaped notch.

* * * * *